United States Patent
Kamatani et al.

(10) Patent No.: US 9,550,491 B2
(45) Date of Patent: Jan. 24, 2017

(54) VEHICLE CONTROL APPARATUS

(75) Inventors: Hideki Kamatani, Toyota (JP); Takeshi Kotani, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 79 days.

(21) Appl. No.: 14/370,381

(22) PCT Filed: Jan. 4, 2012

(86) PCT No.: PCT/JP2012/000002
§ 371 (c)(1),
(2), (4) Date: Jul. 2, 2014

(87) PCT Pub. No.: WO2013/102945
PCT Pub. Date: Jul. 11, 2013

(65) Prior Publication Data
US 2015/0039168 A1    Feb. 5, 2015

(51) Int. Cl.
*B60W 10/06*    (2006.01)
*B60W 10/08*    (2006.01)
(Continued)

(52) U.S. Cl.
CPC ............. *B60W 20/00* (2013.01); *B60K 6/445* (2013.01); *B60W 10/06* (2013.01); *B60W 10/08* (2013.01); *F02D 13/0219* (2013.01); *F02D 29/02* (2013.01); *F02D 41/045* (2013.01); *F02D 41/062* (2013.01); *F02N 11/0833* (2013.01);
(Continued)

(58) Field of Classification Search
CPC .. B60W 10/06; B60W 20/00; B60W 2710/06; B60W 2540/10; B60W 2510/081; B60W 2710/0677; B60W 2520/28; B60W 2710/065; B60L 15/20; B60L 2240/12; B60L 2240/441; B60K 6/24; A61H 2201/5084; F02N 11/00; F02N 11/0814
See application file for complete search history.

(56) References Cited

U.S. PATENT DOCUMENTS 4,739,741 A * 4/1988 Iwata .................... F02D 41/064
                                                    123/179.15
6,253,127 B1* 6/2001 Itoyama ................ B60W 10/06
                                                    123/179.1
(Continued)

FOREIGN PATENT DOCUMENTS

CN    101045453 A    10/2007
JP    H11-117840 A    4/1999
(Continued)

*Primary Examiner* — Jerrah Edwards
*Assistant Examiner* — Demetra Smith-Stewart
(74) *Attorney, Agent, or Firm* — Andrews Kurth Kenyon LLP

(57) ABSTRACT

Disclosed is a vehicle control apparatus which can execute a start-up control for improving acceleration performance at the time of starting an internal combustion engine during the running of a hybrid vehicle. When a hybrid ECU determines that a predetermined time has not yet elapsed after termination of the start-up control of the engine, and that the hybrid vehicle is in a high speed, high load condition, but not in a warming-up state, the hybrid ECU sets a value Nupest2 larger than a value Nupest1, that is usually set as a maximum value Krmx of a rise rate of an engine rotational speed.

5 Claims, 7 Drawing Sheets

(51) Int. Cl.
*B60W 20/00* (2016.01)
*B60K 6/445* (2007.10)
*F02D 29/02* (2006.01)
*F02D 13/02* (2006.01)
*F02D 41/04* (2006.01)
*F02D 41/06* (2006.01)
*F02N 11/08* (2006.01)
*F01L 1/053* (2006.01)
*F01L 1/26* (2006.01)
*F01L 1/344* (2006.01)
*F16H 37/08* (2006.01)

(52) U.S. Cl.
CPC ..... *B60W 2710/0661* (2013.01); *F01L 1/0532* (2013.01); *F01L 1/267* (2013.01); *F01L 1/344* (2013.01); *F01L 1/3442* (2013.01); *F01L 2001/0537* (2013.01); *F01L 2001/34496* (2013.01); *F01L 2103/01* (2013.01); *F01L 2250/04* (2013.01); *F01L 2820/032* (2013.01); *F01L 2820/041* (2013.01); *F01L 2820/042* (2013.01); *F02D 2013/0292* (2013.01); *F02D 2200/021* (2013.01); *F02D 2200/101* (2013.01); *F02D 2200/1012* (2013.01); *F02D 2200/501* (2013.01); *F02N 2200/022* (2013.01); *F02N 2300/102* (2013.01); *F16H 2037/0866* (2013.01); *Y02T 10/18* (2013.01); *Y02T 10/48* (2013.01); *Y02T 10/6239* (2013.01)

(56) References Cited

U.S. PATENT DOCUMENTS

| | | | | |
|---|---|---|---|---|
| 6,434,475 | B2* | 8/2002 | Kaneko | 123/179.4 |
| 7,303,505 | B2* | 12/2007 | Kanafani | B60W 10/06 477/107 |
| 7,353,105 | B2* | 4/2008 | Mino | F02D 31/007 123/350 |
| 7,957,880 | B2* | 6/2011 | Watabe | B60K 28/16 180/197 |
| 8,331,580 | B2* | 12/2012 | Isozaki | B60L 3/00 340/441 |
| 9,061,681 | B2* | 6/2015 | Yoshida | B60K 6/48 |
| 2005/0282682 | A1* | 12/2005 | Ishii | B60W 10/06 477/107 |
| 2007/0227791 | A1 | 10/2007 | Ueno | |
| 2009/0043468 | A1* | 2/2009 | Kondo | B60W 10/06 701/61 |

FOREIGN PATENT DOCUMENTS

| | | |
|---|---|---|
| JP | 2009-180231 A | 8/2009 |
| JP | 2010-084610 A | 4/2010 |
| JP | 2010-111300 A | 5/2010 |
| JP | 2010-120449 A | 6/2010 |
| JP | 2010-159685 A | 7/2010 |
| JP | 2010-168913 A | 8/2010 |
| JP | 2011-163233 A | 8/2011 |
| JP | 2011-255784 A | 12/2011 |

* cited by examiner

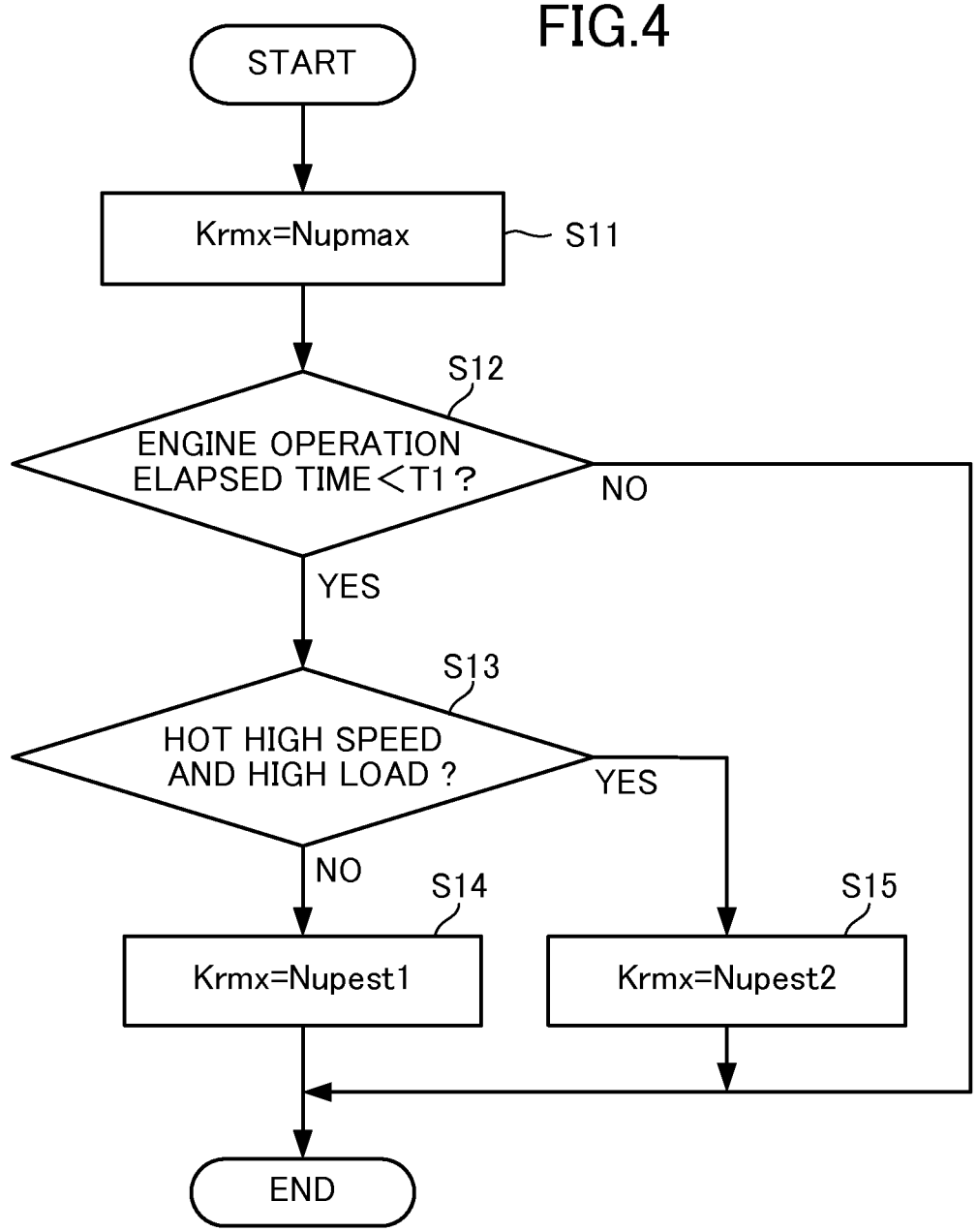

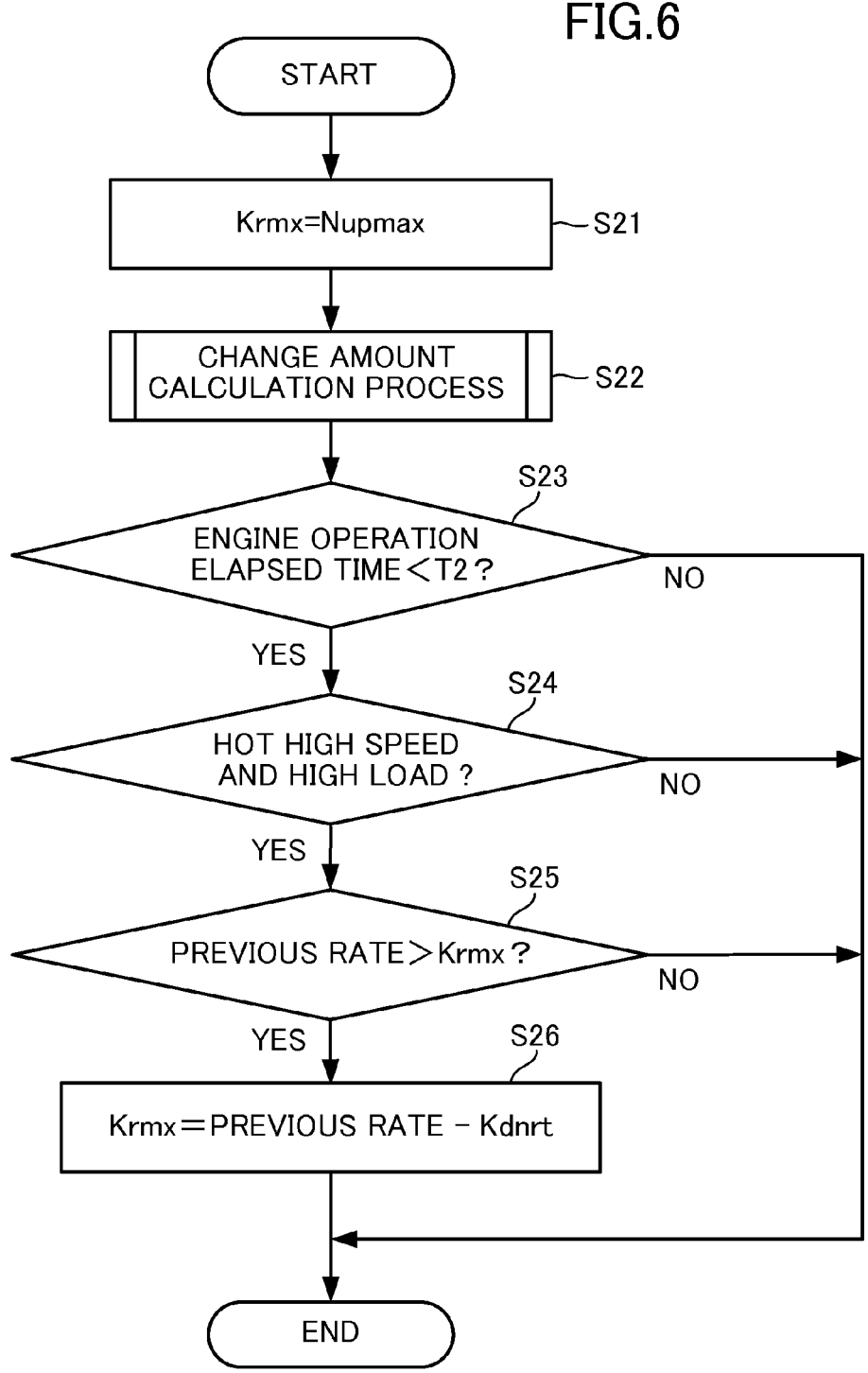

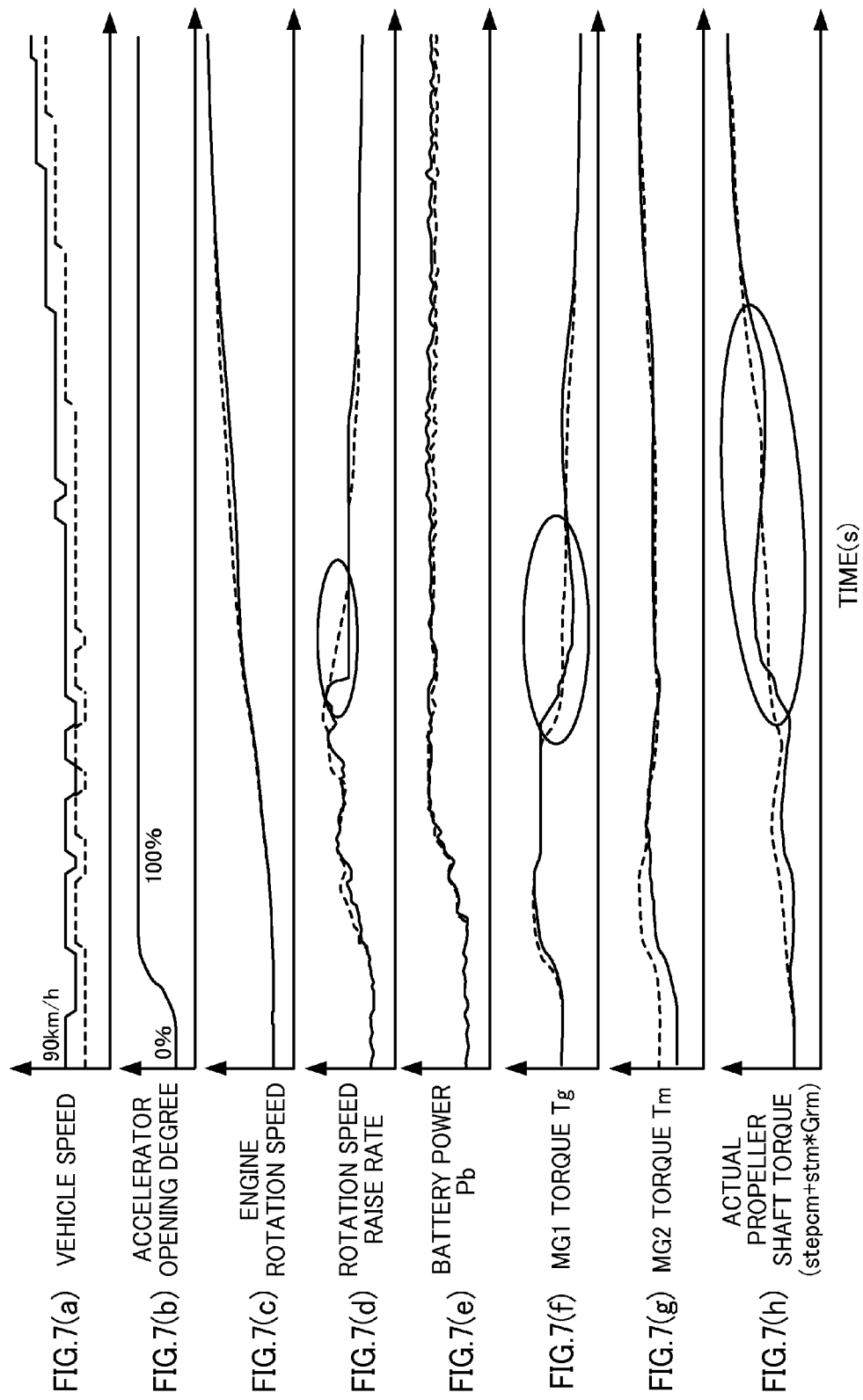

VEHICLE CONTROL APPARATUS

CROSS-REFERENCE TO RELATED APPLICATIONS

This is a national phase application based on the PCT International Patent Application No. PCT/JP2012/000002 filed Jan. 4, 2012, the entire contents of which are incorporated herein by reference.

TECHNICAL FIELD

The present invention relates to a vehicle control apparatus provided with an internal combustion engine and a rotary electric machine each functioning as a power source.

BACKGROUND ART

In recent years, there has been proposed a hybrid vehicle which is provided with an internal combustion engine and a rotary electric machine each functioning as a power source. One of the hybrid vehicles is known to have a power distribution mechanism through which the internal combustion engine and the rotary electric machine are connected with each other, so that the internal combustion engine can be operated to be changed between an operation state and a stopped state in response to a running state of the hybrid vehicle such as a vehicle speed and a depression amount of an acceleration pedal while the hybrid vehicle is running.

Among the hybrid vehicles as mentioned above, there are some hybrid vehicles which are different from a vehicle provided with only a conventional internal combustion engine functioning as a power source, and adapted to start an operation of the internal combustion engine by an output power of the rotary electric machine in place of starting the operation of the internal combustion engine by a cell motor.

Such a hybrid vehicle as mentioned above is known to have an operation starting apparatus for the internal combustion engine which can limit the output power of the rotary electric machine to reduce the consumption of electric power of the rotary electric machine (see for example Patent Document 1).

The previously mentioned operation starting apparatus is constructed to start the internal combustion engine by driving the rotary electric machine, connected with an output shaft of the internal combustion engine through a damper, with an aid of a battery. The operation starting apparatus comprises a rotational speed detection unit for detecting the rotational speed of the internal combustion engine, and a starting torque setting unit for gradually increasing the starting torque to be applied to the output shaft of the internal combustion engine at a low rotation time when the rotational speed of the internal combustion engine is lower than a predetermined value. The operation starting apparatus thus constructed can suppress the consumption of excessively large electric power generated in a drive starting operation of the rotary electric machine, thereby making it possible to reduce the electric power consumption for the starting operation of the internal combustion engine.

CITATION LIST

Patent Literature

Patent Document 1: Patent Publication H11-117840

SUMMARY OF INVENTION

Technical Problem

The conventional operation starting apparatus described in the Patent Document 1 previously mentioned is, however, not designed in consideration of the starting operation of the internal combustion engine when the hybrid vehicle is running at a high speed. For this reason, the time for raising the rotational speed of the internal combustion is delayed even when the internal combustion engine is started in the state in which the hybrid vehicle is running at the high speed, thereby taking much time to raise an acceleration speed of the hybrid vehicle. The conventional operation starting apparatus thus constructed therefore encounters such a problem that a driver tends to have an uncomfortable feeling to an acceleration performance at the time of starting the operation of the internal combustion engine.

The present invention is made to solve such a problem, and has an object to provide a vehicle control apparatus which can improve the acceleration performance at the time of starting the operation of the internal combustion engine during the running of the vehicle.

Solution to Problem

For achieving the foregoing object, a vehicle control apparatus according to the present invention is provided with an internal combustion engine having an output shaft and a rotary electric machine each functioning as a power source, and operative in states changeable between a stopped state and an operation state of the internal combustion engine while a vehicle is running. The vehicle control apparatus comprising: an internal combustion engine starting unit that rotates the output shaft of the internal combustion engine with a power of the rotary electric machine to have the internal combustion engine transferred from the stopped state to the operation state, and a rise rate setting unit that sets a rise rate of an engine rotational speed of the internal combustion engine, wherein the rise rate setting unit being operative to set the rise rate of the engine rotational speed of the internal combustion engine at a level higher in a case that a condition is established with a vehicle speed higher than a predetermined value, and with a value indicative of an acceleration request higher than a predetermined value, at a time when a transfer from the stopped state to the operation state of the internal combustion engine by the internal combustion engine starting unit is completed, as compared with a case that the condition is not established with the vehicle speed higher than a predetermined value, and with the value indicative of the acceleration request higher than a predetermined value, at the time when the transfer from the stopped state to the operation state of the internal combustion engine by the internal combustion engine starting unit is completed.

The vehicle control apparatus as set forth in the above can increase the rise rate of the engine rotational speed immediately after the starting operation of the internal combustion engine when the vehicle speed is equal to or higher than a predetermined value, and the value indicative of the acceleration request of the vehicle is equal to or higher than a predetermined value. The internal combustion engine starting unit can therefore rapidly increase the engine rotational speed of the internal combustion engine up to the engine rotational speed at which the acceleration of the vehicle is increased, for example, when the accelerator pedal is depressed by a driver over the predetermined value during the high speed running of the vehicle, thereby making it possible to improve the acceleration performance of the vehicle.

In particular, when the vehicle is in the high speed running state, as compared with when the vehicle is in the low speed running state, the torque with respect to the power outputted from the power source becomes small, so that the driver is difficult to feel a deterioration of the acceleration feeling of the vehicle even if the output of the power source is partly lost by the inertia torque of the internal combustion engine for the purpose of increasing the rotational speed of the engine, and in reverse the driver can feel sluggish acceleration when the increase of the acceleration is delayed due to the delay of the increase of the engine rotational speed of the internal combustion engine. The acceleration feeling to the driver can therefore be improved by increasing the rise rate of the engine rotational speed of the internal combustion engine during the high speed running of the vehicle.

The vehicle control apparatus constructed as set forth in the above preferably further comprises a rise rate detection unit that detect the rise rate of the engine rotational speed in accordance with a rotation of the output shaft of the internal combustion engine, the rise rate setting unit being operative to divide and subtract the set rise when the rise rate of the engine rotational speed detected by the rise rate detection unit exceeds the set rise rate.

The vehicle control apparatus constructed as set forth in the above can smoothly divide and subtract the set rise rate even if the rise rate of the engine rotational speed of the internal combustion engine exceeds the preliminarily set rise rate, so that the vehicle control apparatus can suppress the fluctuation of the torque to be transmitted to the drive wheels with the rise rate of the engine rotational speed of the internal combustion engine being abruptly decreased, and to suppress the uncomfortable feeling caused by the fluctuation of the acceleration from being given to the driver.

In the vehicle control apparatus as set forth in the above, the rise rate setting unit is preferably operative to set as a new rise rate of the engine rotational speed a value reduced by a predetermined value from the detected rise rate of the engine rotational speed.

The vehicle control apparatus constructed as set forth in the above can smoothly divide and subtract the set rise rate even if the rise rate of the engine rotational speed of the internal combustion engine exceeds the preliminarily set rise rate, so that the vehicle control apparatus can suppress the fluctuation of the torque to be transmitted to the drive wheels with the rise rate of the engine rotational speed of the internal combustion engine being abruptly decreased, and to suppress the uncomfortable feeling caused by the fluctuation of the acceleration from being given to the driver.

In the vehicle control apparatus as set forth in the above, the rise rate setting unit may preferably use an accelerator opening degree as the acceleration request.

The vehicle control apparatus constructed as set forth in the above can set the rise rate of the engine rotational speed by using an accelerator opening degree representative of the acceleration request by the driver, so that the vehicle control apparatus can execute the control of the internal combustion engine capable of improving the acceleration feeling of the driver.

In the vehicle control apparatus as set forth in the above, the rise rate setting unit is preferably operative to set the rise rate of the engine rotational speed at a level higher as the accelerator opening degree is higher.

The vehicle control apparatus constructed as set forth in the above can set a higher rise rate of the engine rotational speed in response to the larger acceleration request by the driver, so that the vehicle control apparatus can rapidly increase the engine rotational speed of the internal combustion engine, thereby making it possible to improve the acceleration feeling of the driver.

Advantageous Effects of Invention

The present invention can provide a vehicle control apparatus which can improve the acceleration performance at the time of starting the operation of the internal combustion engine during the running of the vehicle.

BRIEF DESCRIPTION OF DRAWINGS

FIG. 4 is a flow chart used for explaining a target rotational speed variation amount calculation process according to the embodiment of the present invention.

FIG. 6 is a flow chart used for explaining a rise rate lowering process according to the embodiment of the present invention.

FIG. 7 is a timing chart showing a behavior of the hybrid vehicle which has executed the target rotational speed variation amount calculation process and the rise rate lowering process according to the embodiment of the present invention.

DESCRIPTION OF EMBODIMENTS

The embodiment of the present invention will be explained hereinafter with reference to the drawings. The following explanation will be made raising an example in which the vehicle control apparatus according to the present invention is applied to a hybrid vehicle of a parallel series type which can travel with by the motor generator only.

Figure 1:
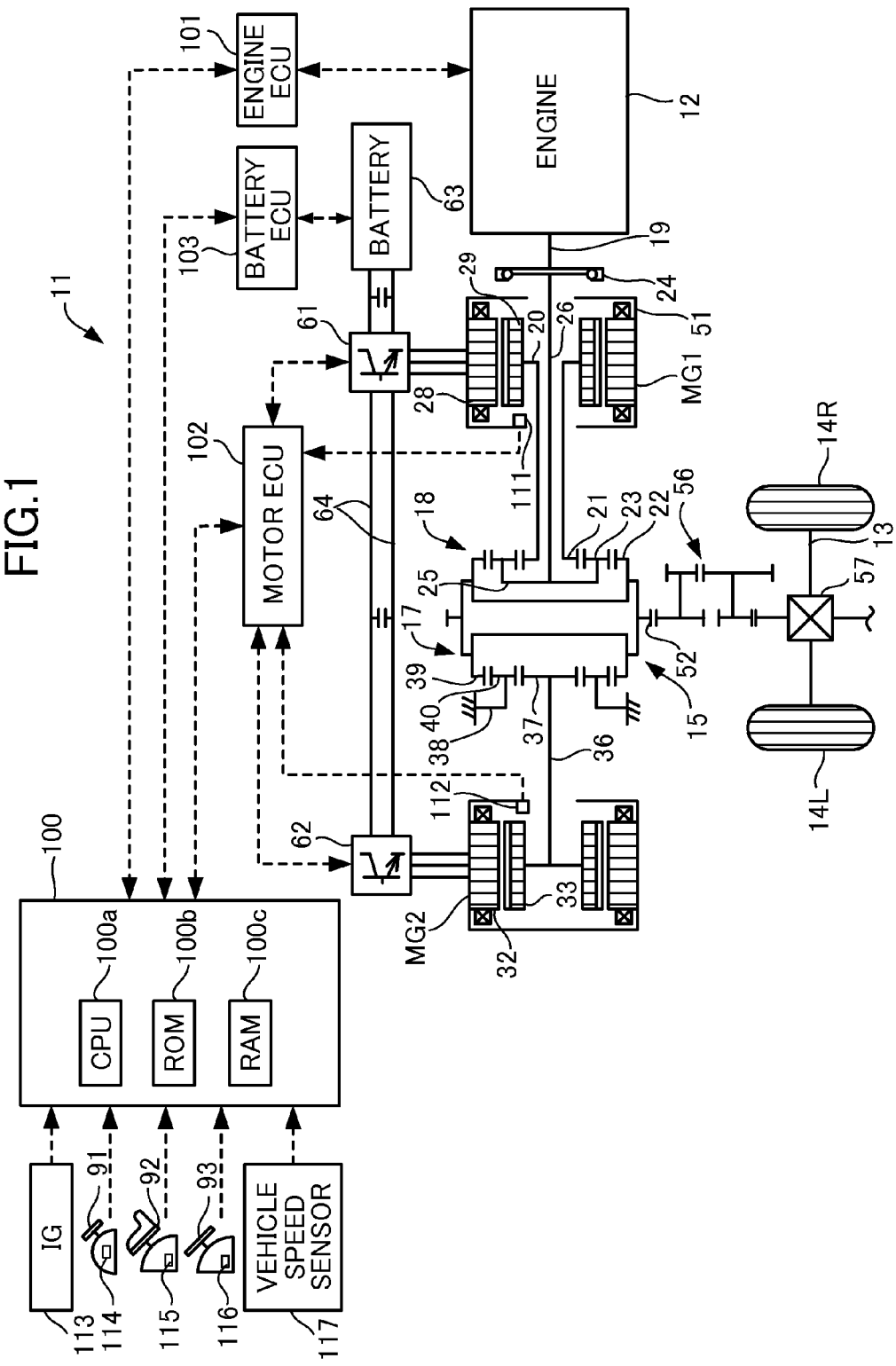
FIG. 1 is a schematic construction view of a vehicle with a control apparatus mounted thereon according to the embodiment of the present invention.

As shown in FIG. 1, a hybrid vehicle 11 is provided with an engine 12 functioning as an internal combustion engine, a power transmission device 15, and a hybrid electronic control unit (hereinafter simply referred to as a hybrid ECU) 100. The power transmission device 15 is adapted to transmit the power inputted from the engine 12 to drive wheels 14L, 14R through drive shafts 13 each functioning as a wheel driving shaft, while the hybrid ECU 100 is adapted to control all elements and parts of the hybrid vehicle 11.

The engine 12 is constructed to burn fuel such as gasoline and light oil to output the drive power, and operated in accordance with the operation control such as a fuel injection control, an ignition control, and an intake air amount adjustment control being performed by an engine electronic control unit (hereinafter simply referred to as an engine ECU) 101 inputted with signals from various kinds of sensors which can respectively detect the operation states of the engine 12.

The engine ECU 101 is adapted to be communicated with the hybrid ECU 100 through a high speed CAN (Controller Area Network), so that the engine ECU 101 can control the operation of the engine 12 in accordance with the control signals inputted from the hybrid ECU 100 and to output signals indicative of data relating to the operation states of the engine 12 to the hybrid ECU 100 if necessary.

The power transmission device 15 comprises a motor generator MG1, a motor generator MG2, a reduction gear device 17 connected with a rotary shaft 36 forming part of the motor generator MG2, and a power distribution mechanism 18 that can distribute the power between the engine 12 and the motor generator MG1.

The power distribution mechanism 18 is provided with a sun gear 21, a ring gear 22, a plurality of pinion gears 23, and an input shaft 26. The sun gear 21 is connected with a hollow sun gear shaft 20 axially extending around a crankshaft 19 functioning as the output shaft of the engine 12. The ring gear 22 is held in coaxial alignment with the sun gear 21. The pinion gears 23 are arranged between the sun gear 21 and the ring gear 22 to be revolvable around the outer periphery of the sun gear 21 and rotatable around their respective center axes. The input shaft 26 is connected with an end portion of the crankshaft 19 through a damper 24. The power distribution mechanism 18 is provided with a carrier 25 that supports rotation shafts respectively forming parts of the pinion gears 23. The sun gear 21, the ring gear 22, and the carrier 25 function as rotational elements, respectively, and thus collectively constitute a planetary gear mechanism which can perform a differential motion.

The motor generator MG1 selectively functions as an electric generator or as an electric motor in response to the power distribution and integration of the power to be performed by the power distribution mechanism 18. The power distribution mechanism 18 is operative to selectively perform a power distribution operation or a power integration operation. More specifically, the power distribution operation is performed by the power distribution mechanism 18 at the running time of the hybrid vehicle 11 to distribute the power inputted to the carrier 25 from the engine 12 to the side of the sun gear 21 and the side of the ring gear 22 in response to the gear ratio thereof to have the motor generator MG1 function as an electric generator and to transmit the power to the drive wheels 14L, 14R. When the motor generator MG1 functions as an electric motor at the running time of the hybrid vehicle 11, the power distribution mechanism 18 is operative to integrate the power from the engine 12 to be inputted through the carrier 25 and the power from the motor generator MG1 to be inputted through the sun gear 21 to output the power to the side of the ring gear 22.

Further, when the engine 12 is started during a stoppage of the hybrid vehicle 11, the power distribution mechanism 18 is adapted to transmit the power from the engine 12 to the motor generator MG1, so that the power transmitted to the motor generator MG1 makes the motor generator MG1 function as an electric generator.

The motor generator MG1 is operated to increase the rotational speed of the sun gear shaft 20 in the direction the same as the rotation direction of the crankshaft 19 during the stoppage of the engine 12 at any one of the running time and the stoppage of the hybrid vehicle 11, thereby causing the crankshaft 19 of the engine 12 to be rotated and having the engine 12 start in operation.

The motor generator MG2 functions as a power source to transmit the power to the drive wheels 14L, 14R at a start moving time and at a low load running time of the vehicle 11 from the stoppage of the engine 12.

The motor generator MG1 is provided with a stator 28 for forming a rotary magnet flux, and a rotor 29 arranged in the stator 28 to have a plurality of permanent magnets embedded therein. The stator 28 has a stator core and a three-phase coil wounded around the stator core.

The rotor 29 is connected with the sun gear shaft 20 integrally rotated with the sun gear 21 of the power distribution mechanism 18, while the stator core of the stator 28 is for example formed with thin magnetic steel plates piled together, and secured to the inner peripheral portion of the body case 51. This means that the motor generator MG1 is accommodated in the body case 51.

The motor generator MG1 thus constructed is adapted to be operated as an electric motor that rotates and drives the rotor 29 by the interaction of the magnetic field produced by the permanent magnets embedded in the rotor 29 and the magnetic field produced by the three-phase coil. The motor generator MG1 is adapted to be operated as an electric generator that generates an electromotive force at both ends of the three-phase coil by the interaction of the magnetic field produced by the permanent magnets and the rotation of the rotor 29.

The motor generator MG2 is provided with a stator 32 for forming a rotary magnet flux, and a rotor 33 arranged in the stator 32 to have a plurality of permanent magnets embedded therein. The stator 32 has a stator core and a three-phase coil wounded around the stator core.

The rotary shaft 36 of the rotor 33 is connected with the reduction gear device 17, while the stator core of the stator 32 is for example formed with thin magnetic steel plates piled together, and secured to the inner peripheral portion of the body case 51. This means that the motor generator MG2 is accommodated in the body case 51.

The motor generator MG2 is constructed to be operated as an electric generator that generates an electromotive force at both ends of the three-phase coil by the interaction of the magnetic field produced by the permanent magnets and the rotation of the rotor 33. Further, the motor generator MG2 is configured to be operated as an electric motor for rotating the rotor 33 by the interaction of the magnetic field produced by the permanent magnets and the magnetic field formed by three-phase coil.

Further, the reduction gear device 17 is adapted to perform reduction with a structure in which the carrier 38 is fixed to the main body case 51 of the power transmission device 15. More specifically, the reduction gear device 17 comprises a sun gear 37 connected with the rotor shaft 36 of the rotor 33, a ring gear 39 rotating together with ring gear 22 of the power distribution mechanism 18, a pinion gear 40 meshing with the ring gear 39 and the sun gear 37 to transmit the rotation of the sun gear 37 to the ring gear 39, and a carrier 38 rotatably supporting the pinion gear 40.

Further, the reduction gear device 17 constitutes a planetary gear mechanism that allows the differential motion to be performed with the sun gear rotating element 37, the ring gear 39, and the carrier 38 functioning as rotary elements, respectively.

Further, the ring gear 39 of the reduction gear device 17 and the ring gear 22 of the power distribution mechanism 18 are provided with a counter drive gear 52 which is rotated integrally with the ring gear 39 and the ring gear 22. The counter drive gear 52 is connected with the gear mechanism 56 which is in turn connected with the differential gear 57. The power outputted to the counter drive gear 52 is adapted to be transmitted to the differential gear 57 from the counter drive gear 52 through the gear mechanism 56.

The differential gear 57 is connected with the drive shafts 13 which are in turn connected with the drive wheels 14L, the 14R, respectively. The power transmitted to the differential gear 57 is configured to be outputted to the drive wheels 14L, 14R through the drive shafts 13.

Further, the motor generator MG1 and the motor generator MG2 are configured to have the powers to be exchanged with the battery 63 through the inverter 61 and the inverter 62, respectively.

The power lines 64 connecting the battery 63 and the inverter 62 and the inverter 61 are configured as a positive bus and a negative bus common to the inverter 61 and the inverter 62. The electric power generated by one of the motor generator MG1 and the motor generator MG2 is adapted to be consumed by the other of the motor generator MG1 and the motor generator MG2. The battery 63 is therefore charged and discharged by the power shortage or the power generated from any one of the motor generator MG1 and motor generator MG2.

Further, the motor generator MG1 and the motor generator MG2 are both adapted to be driven and controlled by a motor electronic control unit (hereinafter simply referred to as a motor ECU) 102.

The motor ECU 102 is inputted with signals required for driving and controlling the motor generator MG1 and the motor generator MG2, for example, signals from a rotational position detection sensor 111 and a rotational position detection sensor 112 respectively detecting the rotational positions of the rotors of the motor generator MG1 and the motor generator MG2, and phase currents detected by current sensors (not shown) to be applied to the motor generator MG1 and the motor generator MG2, respectively. On the other hand, the motor ECU 102 is configured to output switching control signals to the inverter 61 and the inverter 62, respectively.

The motor ECU 102 is adapted to be communicated with the hybrid ECU 100 through the high speed CAN, and to drive the motor generator MG1 and the motor generator MG2 by controlling the inverter 61 and the inverter 62 in response to the control signal inputted from the hybrid ECU 100. The motor ECU 102 is adapted to output to the hybrid ECU 100 signals indicative of data relating to the operating states of the motor generator MG1 and the motor generator MG2 if needed.

The battery 63 is managed by a battery electronic control unit (hereinafter simply referred to as a battery ECU) 103 with conditions such as storage capacity and temperature thereof. The battery ECU 103 is adapted to be inputted with signals necessary for managing the state of the battery 63, for example, signals indicative of terminal voltages from voltage sensors (not shown) located between the terminals of the battery 63, signals indicative of charge-discharge currents from respective current sensors (not shown) attached to the power lines 64, respectively, connected with the output terminals of the battery 63, and a signal indicative of a battery temperature from a temperature sensor (not shown) attached to the battery 63, and other signals. The battery ECU 103 is adapted to output to the hybrid ECU 100 a signal indicative of data relating to the state of the battery 63 if needed. Further, the battery ECU 103 is adapted to calculate SOC (State of Charge) indicative of the remaining capacity based on the integrated values of the charge-discharge currents detected by the current sensors, for control of the state of the battery 63.

On the other hand, as shown in FIG. 1, the hybrid ECU 100 is constituted by a microprocessor mainly including a CPU (Central Processing Unit) 100a. Further, the hybrid ECU 100 further comprises a ROM for storing a processing program (Read Only Memory) 100b, a RAM (Random Access Memory) 100c for temporarily storing the data, and communication ports and input/output ports (not shown).

The hybrid ECU 100 is inputted with an ignition signal Ig from an ignition switch (IG) 113, a shift position signal SP from a shift position sensor 114 for detecting the operating position of the shift lever 91 to manually be operated by the driver, an accelerator opening degree signal Acc from an accelerator pedal position sensor 115 for detecting the amount of depression of an accelerator pedal 92 to be depressed by the driver, a brake pedal position signal BP from a brake pedal position sensor 116 for detecting the amount of depression of a brake pedal 93, a vehicle speed signal V from the vehicle speed sensor 117, and other signals by way of the respective input ports.

As described above, the hybrid ECU 100 is mutually connected with the engine ECU 101, the motor ECU 102, the battery ECU 103 through high speed CANs, so that the hybrid ECU 100 can perform the exchange of data and various control signals with the engine ECU 101, the motor ECU 102, and the battery ECU 103.

Figure 2:
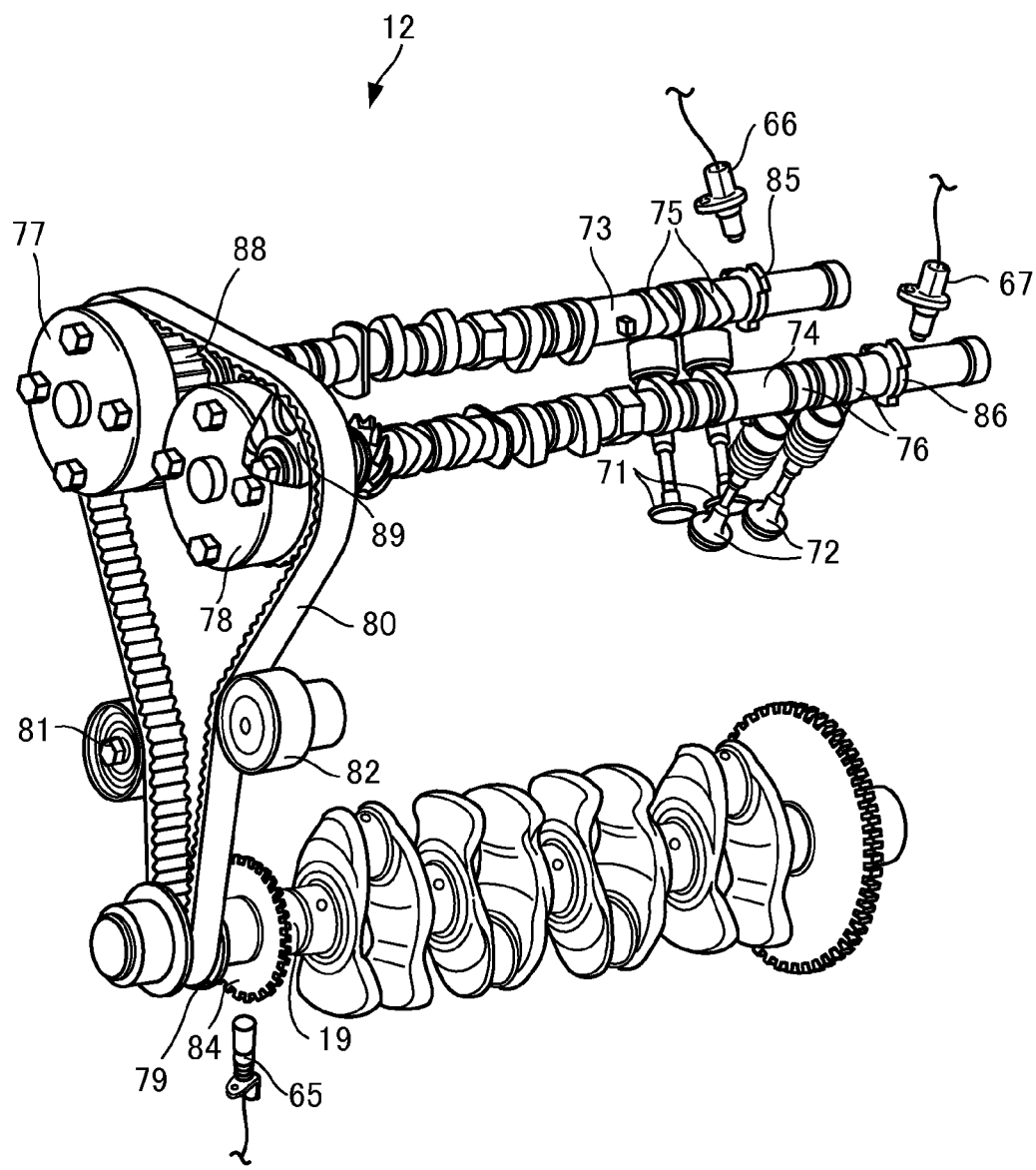
FIG. 2 is a schematic perspective view of an engine according to the embodiment of the present invention.

As shown in FIG. 2, the engine 12 has an intake camshaft 73 and an exhaust camshaft 74 rotatably provided on the upper portion of a cylinder head (not shown).

The intake camshaft 73 is provided with an intake cam 75 held in contact with the upper end of an intake valve 71, so that when the intake camshaft 73 is rotated, the intake valve 71 is driven to selectively be opened or closed by the intake cam 75.

Further, the exhaust camshaft 74 is provided with an exhaust cam 76 held in contact with the upper end of the exhaust valve 72, so that when the exhaust camshaft 74 is rotated, the exhaust valve 72 is driven to selectively be opened or closed by the exhaust cam 76.

At one end of the intake camshaft 73 is provided an intake side rotation phase controller 77 which can rotate the intake camshaft 73 with respect to an intake cam sprocket 88. Further, at one end of the exhaust camshaft 74 is provided an exhaust side rotation phase controller 78 which can also rotate the exhaust camshaft 74 with respect to an exhaust cam sprocket 89. On the other hand, the crankshaft 19 serving as a driving side rotation shaft has a crank sprocket 79 mounted thereon.

The intake side rotation phase controller 77 is configured to be controlled by the hybrid ECU 100 through the engine ECU 101, thereby making it possible to perform a VVT (Variable Valve Timing) control to control the rotation of the intake camshaft 73 with respect to the intake cam sprocket 88 in an advance in angle or a retard in angle. Further, the exhaust side rotational phase controller 78 is configured to be controlled by the hybrid ECU 100 through the engine ECU 101, thereby making it possible to perform another VVT control to control the rotation of the exhaust camshaft 74 with respect to the exhaust cam sprocket 89.

The intake cam sprockets 88, the exhaust cam sprocket 89, and the crank sprocket 79 previously mentioned have a timing belt 80 wound thereon. This construction leads to the fact that the timing belt 80 causes the rotation of the crank sprocket 79 to be transmitted to the intake cam sprocket 88 and the exhaust cam sprocket 89. This means that the rotation of the crankshaft 19 serving as a driving side rotation shaft is transmitted through the timing belt 80 to the intake camshaft 73 and the exhaust camshaft 74 respectively serving as driven side rotation shafts. This construction results in the fact that the intake valve 71 and the exhaust valve 72 to be driven by the intake camshaft 73 and the exhaust camshaft 74, respectively, are adapted to have the intake port and the exhaust port, formed in the cylinder, selectively opened or closed in synchronization with the crankshaft 19. Further, the path of the timing belt 80 is restricted by a tensioner 81 and an idler pulley 82.

Further, the engine 12 is provided with a crank angle sensor 65, an intake cam angle sensor 66, and an exhaust cam angle sensor 67.

The intake cam angle sensor 66 is adapted to be controlled by the hybrid ECU 100 through the engine ECU 101, thereby making it possible to detect the rotational speed of the intake camshaft 73 to output a detection signal indicative of the rotational speed thus detected to the hybrid ECU 100 through the engine ECU 101.

Similarly to the intake cam angle sensor 66, the exhaust cam angle sensor 67 is adapted to be controlled by the hybrid ECU 100, thereby making it possible to detect the rotational speed of the exhaust camshaft 74 to output a detection signal indicative of the rotational speed thus detected to the hybrid ECU 100 through the engine ECU 101.

Further, the crank shaft 19 has a crank sensor plate 84 securely mounted thereon and rotated together with the crankshaft 19. The crank angle sensor 65 has an electromagnetic pick, so that when the crank shaft 19 is rotated, the magnetic flux passing through a coil portion forming part of the electromagnetic pick is increased or decreased by the projections of signal teeth of the crank tooth sensor plate 84 to generate electromotive force. The generated voltage appears as an alternating current, resulting from the fact that the voltages become in the opposite directions between the time when the protrusion of the crank sensor plate 84 moves away from the crank angle sensor 65 and the time when the protrusion of the crank sensor plate 84 moves toward the crank angle sensor 65. Further, the crank angle sensor 65 is adapted to shape a signal indicative of the alternating current to a rectangular wave signal and to output the signal as a Ne signal to the hybrid ECU 100 through the engine ECU 101.

Referring back to FIG. 1, the hybrid ECU 100 is adapted to start the engine 12 through the engine ECU 101 and to transmit the outputted power of the engine 12 to the motor generator MG1, thereby allowing the motor generator MG1 to generate the power in the case that the hybrid ECU 100 determines that the SOC (State of Charge) is reduced to the level in which the battery 63 is required to be charged in accordance with the information inputted from the battery ECU 103 at time of the engine 12 being stopped.

The hybrid vehicle 11 thus constructed is configured to have the hybrid ECU 100 determine that the acceleration request represented by the accelerator opening degree is increased and to start the engine 12 when the accelerator pedal 92 is depressed by a driver while the vehicle is running in a state in which the engine 12 is stopped.

At this time, the hybrid ECU 100 executes a start-up control to start the engine 12 with the crankshaft 19 of the engine 12 being rotated by the motor generator MG1. FIG. 3 is an alignment chart showing the rotational speeds and the torques of the engine 12 and the motor generators MG1, MG2. In FIG. 3, the vertical axes respectively represent the rotational speeds of the engine 12 and the motor generators MG1, MG2. The arrows along the vertical axes respectively represent the magnitudes of the output torques outputted from these power sources.

Figure 3A:
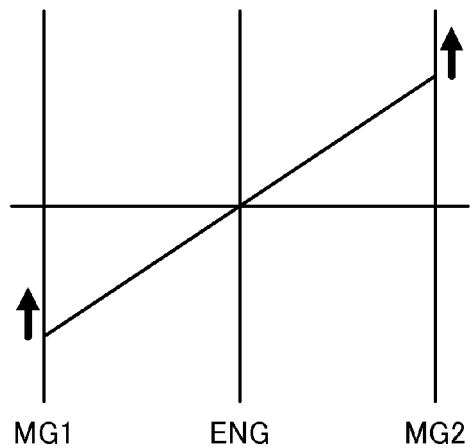
FIG. 3 is an alignment chart used for explaining the states of power sources at the time of starting the engine according to the embodiment of the present invention.
Figure 3B:
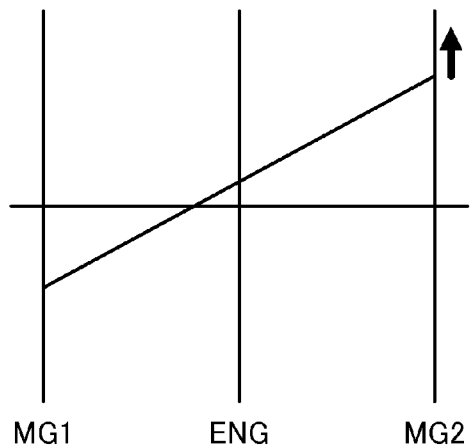
Figure 3C:
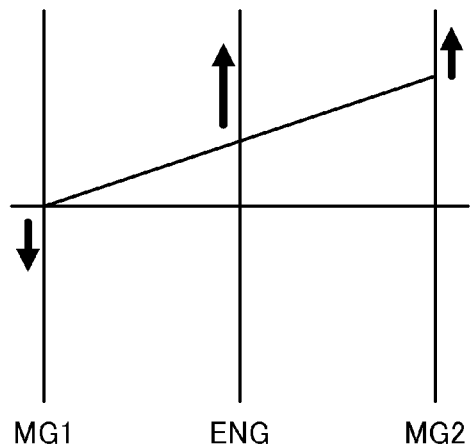
Figure 3D:
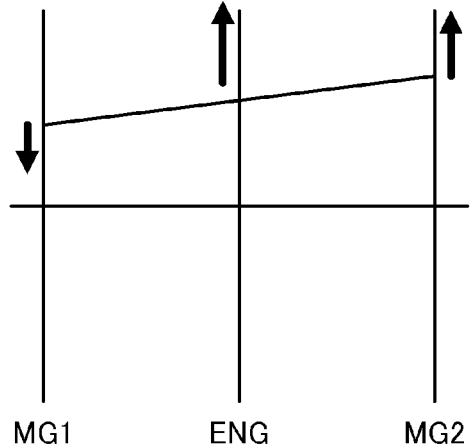

FIG. 3(a) is an alignment chart at the time of starting the start control of the engine 12 from an intermittent state in which the engine rotational speed is zero. In the state in which the hybrid vehicle 11 is traveling by the output torque from the motor generator MG2, the hybrid ECU 100 is operated to transmit the output torque of the motor generator MG1 to the crankshaft 19 of the engine 12, thereby allowing the rotational speed of the engine 12 to start being increased.

When the rotational speed of the engine 12 is increased to a predetermined value as shown in FIG. 3 (b), the hybrid ECU 100 executes the fuel injection control and the ignition control for each cylinder of the engine 12 through the engine ECU 101, thereby completing the starting operation of the engine 12.

Next, as shown in FIG. 3 (c), the torque is generated by the engine 12 with the starting operation of the engine 12 being completed. At this time, the hybrid ECU 100 is operated to have the motor generator MG1 brought into a state in which the motor generator MG1 can generate the power to generate a negative torque due to the fact that the torque is transmitted to the driving wheels 14L, 14R. The hybrid ECU 100 starts a rotational speed feedback control to match the actual engine rotational speed with the target engine rotational speed by adjusting the negative torque.

As shown in FIG. 3 (d), the hybrid vehicle 11 realizes an acceleration running at the time of high speed running by the output torques generated by the engine 12 and the motor generator MG2.

When the starting control of the engine 12 is performed in this way at the time of high speed running of the hybrid vehicle 11, there is occasionally caused a case in which the driver experiences an uncomfortable feeling to an acceleration feeling by the following reason.

When the engine 12 is started during the time of the hybrid vehicle 11 being running, the hybrid ECU 100 allows the rotational speed of the engine 12 to be raised. At this time, there is caused friction acting on the inner portion of the engine 12, while inertia torque is also generated. For this reason, when the rotational speed of the engine 12 is rapidly raised, a portion of the power to be transmitted to each of the drive wheels 14L, 14R from the engine 12 and the motor generator MG2 is consumed for use in increasing the rotational speed of the engine 12, thereby temporarily reducing the driving force of the hybrid vehicle 11. This results in the fact that the driver experiences the uncomfortable feeling to the acceleration feeling.

For this reason, as is known in the art, the hybrid ECU 100 is adapted to suppress the rise rate of the rotational speed of the engine 12 from being reduced, and to suppress the driving force from being reduced in the case of starting the engine 12 during the running operation of the hybrid vehicle 11.

However, each of the torques to be transmitted to the drive wheels 14L, 14R is originally at a small value with respect to the identical output when the hybrid vehicle 11 is running at a high speed, as compared with when the hybrid vehicle 11 is running at a low speed. For this reason, it is difficult for the driver to experience the uncomfortable feeling to the acceleration feeling even if the outputted power generated by each of the drive sources is consumed for increasing the engine rotational speed. In order to ensure that the driver feels the acceleration of the hybrid vehicle 11 in reverse, it is necessary that the driver may receive a force of about 0.1 g. In order to give this force to the driver at the high speed running of the hybrid vehicle 11, it is required to increase the engine rotational speed to the area where the engine 12 can produce a high output.

For this reason, the hybrid ECU 100 according to this embodiment is set at a rise rate of the engine rotational speed higher than a rise rate of the engine rotational speed normally set in the time of the hybrid vehicle 11 running other than the time of the hybrid vehicle 11 running at a high speed to ensure that the engine rotational speed is more rapidly increased than the normal engine rotational speed, thereby making it possible for the driver to rapidly feel the acceleration feeling, so that the uncomfortable feeling to the acceleration feeling to be given to the driver can be suppressed.

Next, the following description will be directed to an example in which the hybrid ECU 100 is operated to set a maximum rise rate of the engine rotational speed. At the high speed and high load time of the hybrid vehicle 11, the hybrid ECU 100 is operated to control the engine 12 in compliance with the maximum value of the rise rate of the engine rotational speed among the rise rates of the engine rotational speed.

Further, in the case that the hybrid ECU 100 is inputted with the signal representative of the acceleration requested by the driver in the high speed running to set the maximum value of the rise rate of the engine rotational speed higher than the normal rise rate of the engine rotational speed, the hybrid ECU 100 is adapted to execute a rise rate lowering process to change the currently set maximum value of the rise rate of the engine rotational speed to a value which is reduced by a predetermined value from the previously detected actual rise rate (hereinafter simply referred to as a previous rate) if the actual rise rate of the engine rotational speed exceeds the set maximum value of the rise rate of the engine rotational speed, and to divide and subtract the rise rate of the engine rotational speed, thereby dividing and subtracting the rise rate of the engine rotational speed to improve the acceleration feeling to the driver.

The hybrid ECU 100 is adapted to calculate the rise rate of the engine rotational speed by a signal inputted from the crank angle sensor 65. Here, the hybrid ECU 100 is adapted to repeatedly perform the rise rate lowering process during the establishment of the conditions described hereinafter. Therefore, the previous rate is intended to mean a rise rate detected in the midst of the rising rate lowering process performed immediately before the rise rate lowering processes currently being performed.

FIG. 4 is a flowchart for explaining a target rotational speed change amount calculation process according to the embodiment of the present invention.

The following processes are carried out to be executed at predetermined time intervals by the CPU 100a constituting part of the hybrid ECU 100, and to realize processable programs by the CPU 100a.

First, the hybrid ECU 100 is operated to set a Nupmax as a maximum Krmx of the engine rotational speed rise rate (Step S11). This Nupmax represents a largest value which can meet the acceleration request in response to the operation of the accelerator pedal 92 by the driver in all of the driving states of the hybrid vehicle 11. The hybrid ECU 100 is therefore operated to set the maximum value of the engine rotational speed rise rate to prioritize the drivability of the driver.

Figure 5:
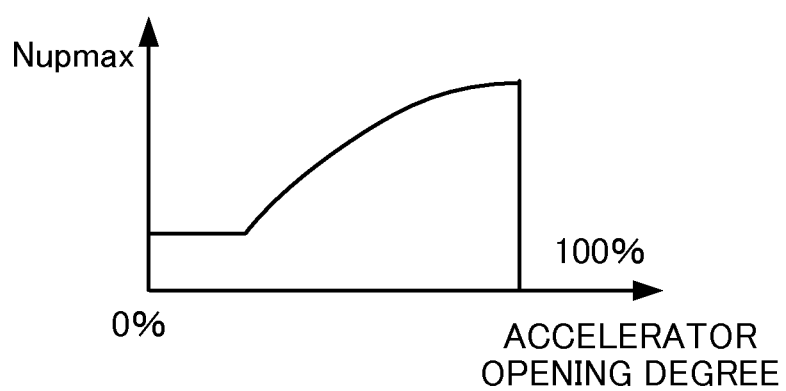
FIG. 5 is a view showing a Nupmax setting map according to the embodiment of the present invent.

In the present embodiment as shown in FIG. 5, the hybrid ECU 100 is adapted to set the Nupmax in response to the accelerator opening degree. In this case, the hybrid ECU 100 is adapted to preliminarily store a Nupmax setting map shown in FIG. 5 in the ROM 100b. The Nupmax setting map is defined to have the Nupmax set at a value increased as the value of the accelerator opening degree is increased. The hybrid ECU 100 is adapted to set the Nupmax with reference to the Nupmax setting map stored in the ROM 100b when acquiring a signal representative of the accelerator opening degree from the accelerator pedal position sensor 115.

Referring back to FIG. 4, the hybrid ECU 100 is operated to determine whether a predetermined time T1 elapses or does not elapse from the time when the starting operation of the engine 12 is completed (Step S12). More specifically, the hybrid ECU 100 has a timer therein, so that the timer starts clocking when the starting operation of the engine 12 is completed. The hybrid ECU 100 determines whether the clocked time exceeds or does not exceed the predetermined time T1 with reference to the timer. The predetermined time T1 is set to be a time required for the rotational speed of the engine 12 to be raised to a rotational speed at which the engine 12 can output a torque sufficiently increased as requested when the hybrid ECU 100 has made a torque request to the engine 12 through the engine ECU 101. The above predetermined time T1 is set for example at the range of 1 to 2 seconds in the present embodiment.

The process proceeds to END when the hybrid ECU 100 determines that the predetermined time T1 has elapsed (NO in Step S12). On the other hand, the process proceeds to the Step S13 when the hybrid ECU 100 determines that the predetermined time T1 has not elapsed (YES in Step S12).

Next, the ECU 100 determines whether or not the hybrid vehicle 11 is under the Hot high speed and high load conditions (Step S13). More specifically, the ECU 100 determines that the hybrid vehicle 11 is under the Hot high speed and high load conditions indicative of high speed and high load conditions but not under a warming-up condition when the signal indicative of the cooling water temperature of the engine 12 inputted from a cooling water sensor (not shown) represents to be equal to or higher than a predetermined value TW1, the signal inputted from the vehicle speed sensor 117 represents to be equal to or higher than a predetermined value SPD1, the signal inputted from the accelerator pedal position sensor 115 represents an accelerator opening degree Acc equal to or larger than a predetermined value AC1. This means that the predetermined value TW1 with respect to the cooling water temperature is set to be a value indicating that the engine 12 is not under the warming-up condition, and that the predetermined value SPD1 with respect to the vehicle speed and the accelerator opening degree AC1 are set to be respective values indicating that the hybrid vehicle 11 is under the high speed and high load conditions.

When the hybrid ECU 100 determines that the hybrid vehicle 11 is not under the Hot high speed and high load conditions (NO in Step S13), the process proceeds to the Step S14. When, on the other hand, the hybrid ECU 100 determines that the hybrid vehicle 11 is under the Hot high speed and high load conditions (YES in Step S13), the process proceeds to the Step S15.

When the process proceeds to the Step S14, the hybrid ECU 100 sets a Nupest1 smaller than the Nupmax as a maximum value Krmx of the engine rotational speed rise rate. The Nupest1 is to be set for the driver not to have an uncomfortable feeling, resulting from the fact that the driving force and the acceleration are reduced due to the fact that the power is lost by the inertia torque of the engine 12 when the engine rotational speed is raised immediately after the engine 12 starts to be operated. The relationship between the increase of the engine rotational speed and the reduction of the driving force is preliminarily determined from the experimental measurements so far carried out.

When, on the other hand, the process proceeds to the Step S15, the hybrid ECU 100 sets a Nupest2 larger than the Nupmax as an maximum value Krmx of the engine rotational speed rise rate. In the present embodiment, the hybrid ECU 100 sets the value of the Nupest2 to be equal to the Nupmax, so that the engine rotational speed can be rapidly increased.

It will therefore be understood from the foregoing description that the hybrid ECU 100 according to the present embodiment can increase the rise rate of the engine rotational speed immediately after the starting operation of the engine 12 when the vehicle speed is equal to or higher than the predetermined value and the acceleration request of the hybrid vehicle 11 is equal to or higher than the predetermined value. The hybrid ECU 100 can therefore rapidly increase the rotational speed of the engine 12 to the rotational speed at which the hybrid vehicle 11 can accelerate the engine 12 for example when the accelerator pedal 92 is depressed to the value equal to or higher than the predetermined value by the driver during the high-speed running of the hybrid vehicle 11. Therefore, the acceleration performance of the hybrid vehicle 11 can be improved.

In particular, when the hybrid vehicle 11 is in the high speed running state, as compared with when the hybrid vehicle 11 is in the low speed running state, the torque with respect to the power outputted from the power source becomes small, so that the driver is difficult to feel the deterioration of the acceleration feeling of the hybrid vehicle 11 even if the output of the power source is lost by the inertia torque of the internal combustion engine for the purpose of increasing the rotational speed of the engine 12, and in reverse the driver can feel sluggish acceleration when the increase of the acceleration is delayed due to the delay of the increase of the engine rotational speed of the internal combustion engine. The acceleration feeling to the driver can therefore be improved by increasing the rise rate of the engine rotational speed of the internal combustion engine during the high speed running of the hybrid vehicle 11.

Further, the hybrid ECU 100 can set the rise rate of the engine rotational speed with the accelerator opening degree representative of the acceleration request by the driver, thereby making it possible to perform the control of the engine 12 in which the acceleration feeling optimized to the driver can be realized.

Further, the hybrid ECU 100 can set a higher rise rate of the engine rotational speed in response to the larger acceleration request by the driver, so that the hybrid ECU 100 can rapidly increase the engine rotational speed, thereby making it possible to improve the acceleration feeling of the driver.

In addition, the hybrid ECU 100 can further improve the drivability during the acceleration of the hybrid vehicle 11 by combining the rise rate lowering process described above with the target rotational speed change amount calculation process.

FIG. 6 is a flowchart for explaining the rise rate lowering process according to the embodiment of the present invention.

First, the hybrid ECU 100 is operated to set a Nupmax as a maximum Krmx of the engine rotational speed rise rate (Step S21). This Nupmax, similarly to the Step 11 previously mentioned, represents a largest value which can meet the acceleration request in response to the operation of the accelerator pedal 92 by the driver in all of the driving states of the hybrid vehicle 11. The hybrid ECU 100 is therefore operated to set the maximum value of the engine rotational speed rise rate to prioritize the drivability of the driver.

Next, the hybrid ECU 100 sets a maximum value Krmx of the engine rotational speed rise rate corresponding to the running state of the hybrid vehicle 11 by the target rotational speed change amount calculation process described above (Step S22). The following description will be directed to an example in which Nupest2 is set to the maximum value Krmx of the engine rotational speed rise rate, the value of Nupest2 being described as being equal to the value of Nupmax.

The hybrid ECU 100 is then operated to determine whether a predetermined time T2 elapses or does not elapse from the time when the starting operation of the engine 12 is completed (Step S23). More specifically, the hybrid ECU 100, similarly to the Step 12 previously mentioned has the timer start clocking when the starting control of the engine 12 starts to be executed. The hybrid ECU 100 determines whether the clocked time exceeds or does not exceed the predetermined time T2 with reference to the timer. The predetermined time T2 is sufficient if a time required to converge the rise rate of the rotational speed is included when the rise rate of the rotational speed is excessively large immediately after the starting control of the engine 12 is completed. In the present embodiment, the predetermined time T2 is set, for example, in the range of 0.2 to 0.4 seconds, but this value can be set appropriately in view of specification values such as the engine 12, the motor generator MG1, and others.

When the hybrid ECU 100 determines that the predetermined time T2 has elapsed (NO in Step S23), the process proceeds to END. When, on the other hand, the hybrid ECU 100 determines that the predetermined time T2 has not elapsed (YES in Step S23), the process proceeds to the Step S24.

The hybrid ECU 100 then determines whether or not the hybrid vehicle 11 is under the Hot high speed and high load conditions (Step S24). More specifically, the ECU 100 determines that the hybrid vehicle 11 is under the Hot high speed and high load conditions when the signal indicative of the cooling water temperature of the engine 12 inputted from a cooling water sensor (not shown) represents to be equal to or higher than a predetermined value TW1, the signal inputted from the vehicle speed sensor 117 represents to be equal to or higher than a predetermined value SPD1, the signal inputted from the accelerator pedal position sensor 115 represents an accelerator opening degree Acc equal to or larger than a predetermined value AC1.

When the hybrid ECU 100 determines that the hybrid vehicle 11 is in the Hot high speed and high load state (YES in Step S24), the process proceeds to the Step S25. When, on the other hand, the hybrid ECU 100 determines that the hybrid vehicle 11 is not in the Hot high speed and high load state (NO in Step S24), the process proceeds to END.

The hybrid ECU 100 determines whether or not the rise rate of the engine rotational speed is larger than the maximum value Krmx set in the Step S22 (Step S25). More specifically, the hybrid ECU 100 detects the rise rate of the engine rotational speed based on the signal inputted from the crank angle sensor 65. The hybrid ECU 100 compares the previous rise rate, i.e., the rise rate detected when the previously Step S25 is executed, with the value Krmx currently set.

When the hybrid ECU 100 determines that the previous rise rate is larger than the value Krmx (YES in Step S25), the process proceeds to the Step S26. When, on the other hand, the hybrid ECU 100 determines that the previous rise rate is smaller than the value Krmx (NO in Step S25), the process proceeds to END.

When the process proceeds to the Step S26, the hybrid ECU 100 sets the maximum value Krmx of the engine rotational speed rise rate to a value that is reduced by a predetermined value Kdnrt from the previous rise rate. The predetermined value Kdnrt is set to, for example, a value sufficiently smaller than the difference between the values of Nupest2 and Nupest1. Further, the hybrid ECU 100 controls the engine 12 to have the engine rotational speed varied in compliance with the engine rotational speed rise rate newly set.

Therefore, in the case of not executing the rise rate lowering process, the starting operation of the engine 12 is completed to have the rise rate of the engine rotational speed set at Nupest2 by the target rotational speed change amount calculation process in the state in which the rise rate of the engine rotational speed is larger than Nupest2 immediately before the starting operation of the engine 12. At this time, there is generated a large difference between the actual rise rate of the engine rotational speed and the set rise rate of the engine rotational speed immediately after the starting operation of the engine 12. Therefore, the difference between the target engine rotational speed calculated from the set rise rate of the engine rotational speed and the actual rise rate of the engine rotational speed becomes large. For reducing the rotational speed difference, the rotational speed feedback control using the motor generator MG1 gives rise to the output fluctuation by the motor generator MG1. As a result, there is caused a variation of a fluctuation of the acceleration, and thus caused a possibility that the driver experiences the uncomfortable feeling.

As in the present embodiment, in the state in which the rise rate of the engine rotational speed immediately before the engine 12 is started is larger than Nupest2, the hybrid ECU 100 can have the rise rate of the engine rotational speed approach the Nupest2 by dividing and subtracting the rise rate, so that the hybrid ECU 100 can suppress the fluctuation of the acceleration from being caused, and can improve the acceleration feeling of the driver.

FIG. 7 is a timing chart showing a behavior of the hybrid vehicle 11 when the hybrid ECU 100 according to the present embodiment executes the target rotational speed change amount calculation process and the rise rate lowering process. In FIG. 7, the solid line indicates the behavior of the hybrid vehicle 11 in the case of executing only the target rotational speed change amount calculation process according to the present embodiment, while the broken line indicates a behavior of the hybrid vehicle 11 when both of the target rotational speed variation calculation process and the rise rate lowering process are performed.

First, it is assumed that the accelerator pedal 92 is strongly depressed by the driver to have the accelerator opening degree becomes in the vicinity of 100% (see graph (b)) in the state in which the hybrid vehicle 11 is traveling at a high speed of 90 km/h (see graph (a)) and the engine 12 is stopped (see graph (c)). In this case, the hybrid ECU 100 determines that the acceleration request represented by the accelerator opening degree cannot be realized by only the output of the motor generator MG2, and the hybrid ECU 100 starts to increase the rotational speed of the motor generator MG1 for starting the operation of the engine 12 (see graph (b)). This results in the engine rotational speed starting to increase (see graph (c)). The rise rate of the engine rotational speed at this time is not fixed.

When the hybrid ECU 100 then determines that the engine rotational speed is increased to the predetermined value, the fuel supply control and the ignition control for the engine 12 are started. The engine 12 starts to be operated, thereby allowing the motor generator MG1 to generate a negative torque due to the reaction force to the output of the engine 12 (see graph (f)). When the engine 12 starts to be operated, the hybrid ECU 100 sets Nupest2 as the rate rise Krmx of the engine rotational speed by the target rotational speed change amount calculation process.

When the target rotational speed change amount calculation process according to the present embodiment is executed, the engine rotational speed is increased at least in compliance with the rise rate Nupest2 with or without the execution of the rising rate lowering process. Accordingly, the engine rotational speed can rapidly reach the engine rotational speed at which the engine 12 generates the power to a degree that the driver can feel the acceleration of the hybrid vehicle 11.

The timing chart shown in FIG. 7 indicates that the rise rate of the engine rotational speed is increased beyond Nupest2.

Here, in the case that the hybrid ECU 100 does not execute the rise rate lowering process described above, the rise rate Nupest2 of the engine rotational speed is set by the starting operation of the engine 12. At this time, the rise rate of the actual engine rotational speed is reduced to Nupest2 (see a circle mark in graph (d)). More specifically, in order to reduce the difference between the target engine rotational speed and the actual engine rotational speed due to the difference between the actual rise rate of the engine rotational speed and the set rise rate of the engine rotational speed, the engine rotational speed feedback control by the motor generator MG1 is performed. When the difference between the actual rise rate of the engine rotational speed and the set rise rate of the engine rotational speed is relatively large, the output torque of the motor generator MG1 is drastically fluctuated (see a circle mark in graph (f)) due to the engine rotational speed feedback. As a result, the driving force to be transmitted to the drive wheels 14L, 14R is fluctuated (see a circle mark in graph (h)), thereby leading to the fact that the driver experiences the uncomfortable feeling to the acceleration feeling of the hybrid vehicle 11.

In contrast, the hybrid ECU 100 executes the rise rate lowering process to reduce the difference between the target engine rotational speed and the actual engine rotational speed, and to suppress the fluctuation of the output variation of the motor generator MG1, thereby making it possible to smoothly increase the driving force.

From the foregoing description, it will therefore be understood that the vehicle control apparatus according to the embodiment of the present invention can divide and subtract the set rise rate of the engine rotational speed even if the rise rate of the engine rotational speed exceeds the preliminarily set rise rate of the engine rotational speed, so that the vehicle control apparatus according to the embodiment can suppress the rise rate of the engine rotational speed from abruptly being reduced, and can suppress the torque to be transmitted to the drive wheels 14L, 14R from being fluctuated, thereby making it possible to suppress the uncomfortable feeling from being given to the driver due to the fluctuation of the acceleration. Therefore, the vehicle control apparatus according to the embodiment can suppress the rise rate of the engine rotational speed from abruptly be reduced, and to suppress the acceleration from being fluctuated, even when the engine 12 is started in the state in which the engine rotational speed is higher than a normal engine rotational speed by the motoring.

Further, the vehicle control apparatus according to an embodiment of the present invention is adapted to set the current rise rate of the engine rotation speed with the value obtained by subtracting a predetermined value from the detection value of the previous rate, so that the vehicle control apparatus according to an embodiment can smoothly divide and subtract the set rise rate of the engine rotational speed even if the rise rate of the engine rotational speed exceeds the preliminarily set rise rate of the engine rotational speed.

Although the above explanation has been directed to the case in which the hybrid ECU 100 sets the value Nupest2 to the value Nupmax in Hot high speed and high load state, the hybrid ECU 100 may set a value smaller than the value Nupmax as a value Nupest2 in the case that the driving force is seen as being more important than the abrupt increase of the engine rotational speed.

Further, the above description has been made about the case in which the hybrid ECU 100 is configured to promote the increase of the engine rotational speed by increasing the rise rate of the engine rotational speed in the starting operation of the engine 12, thereby improving the drivability. However, the hybrid ECU 100 may raise the rise rate of the engine rotational speed by executing the VVT control as described below.

In this case, the hybrid ECU 100 is to execute the VVT control to have the intake side rotational phase controller 77 advance in angle, for example, when setting the Nupest2 to Krmx in the Step S14.

Here, the intake side rotation phase controller 77 constituted by a hydraulic control circuit to be driven by a hydraulic oil. In this case, the hydraulic pressure is not enhanced immediately after the starting operation of the engine 12, so that the intake side rotation phase controller 77 requires several seconds from the start of the engine 12 for rotating the camshaft 73 with respect to the intake cam sprocket 88. It is therefore impossible to increase the engine rotational speed by executing the VVT control immediately after starting the engine 12.

For this reason, the embodiment is so constructed that the intake side rotation phase controller 77 is configured to run on electric power, such as electric motors instead of hydraulic pressure. The hybrid ECU 100, therefore, becomes possible to execute the VVT control by the intake side rotation phase controller 77 immediately after the starting operation of the engine 12, thereby making it possible to raise the rise rate of the engine rotational speed by the torque increase of the engine 12 by the advance in angle.

Further, the above description has been made about the case in which the hybrid ECU 100 performs the rotational speed feedback control to have the actual engine rotational speed approach the target engine rotational speed with the motor generator MG1 after the start of the engine 12. However, the hybrid ECU 100 may serve as means for increasing the engine rotational speed in the present embodiment, and temporarily suspending the rotational speed feedback to have the motor generator MG1 generate a positive output torque, thereby abruptly increasing the engine rotational speed.

Further, the hybrid vehicle 11 according to the present embodiment may be constructed to abruptly increase the engine rotational speed by heightening the maximum output of the battery 63. In this case, it is possible to increase the maximum output of the battery 63, for example, by increasing the number of battery cells 63.

It will therefore be understood from the foregoing description that vehicle control apparatus according to the present invention can bring an excellent advantage to improve the acceleration performance in the starting operation of the internal combustion engine during the running of the vehicle, and thus is useful for a vehicle control apparatus provided with an internal combustion engine and a rotary electric machine as power sources.

EXPLANATION OF REFERENCE NUMERALS

11: hybrid vehicle
12: engine
13: drive shaft
14L, 14R: drive wheels
15: power transmission device
17: reduction gear device
18: power distribution mechanism
19: crankshaft
20: sun gear shaft
26: input shaft
40: pinion gear
51: body case
52: counter drive gear
56: gear mechanism
57: differential gear
63: battery
65: crank angle sensor
66: intake cam angle sensor
67: exhaust cam angle sensor
71: intake valve
72: exhaust valve
73: intake cam shaft
74: exhaust camshaft
75: intake cam
76: exhaust cam
77: intake side rotation phase controller
78: exhaust side rotation phase controller
79: crank sprocket
88: intake cam sprocket
89: exhaust cam sprocket
91: shift lever
92: accelerator pedal
100: hybrid ECU
114: shift position sensor
115: accelerator pedal position sensor
117: vehicle speed sensor

The invention claimed is:

1. A vehicle control apparatus provided with an internal combustion engine having an output shaft and a rotary electric machine each functioning as a power source, and operative in states changeable between a stopped state and an operation state of the internal combustion engine while a vehicle is running, comprising:
at least one electronic control unit configured to:
i) control the rotary electric machine so as to rotate the output shaft of the internal combustion engine with the power of the rotary electric machine in response to an acceleration request to execute a start-up control to have the internal combustion engine transferred from the stopped state to the operation state,
ii) set a rise rate of an engine rotational speed of the internal combustion engine after a completion of the start-up control, wherein
the at least one electronic control unit is configured to set the rise rate of the engine rotational speed of the internal combustion engine to a higher rise rate in a case that a condition is established with a vehicle speed higher than a predetermined vehicle speed value, and with a value indicative of the acceleration request higher than a predetermined value, which is not zero, as compared with a normal rise rate which is set in a case that the condition is not established with the vehicle speed higher than a predetermined value, and with the value indicative of the acceleration request higher than a predetermined value, which is not zero, and the at least one electronic control unit is configured to set the rise rate of the engine rotation speed of the internal combustion engine after the completion of the start-up control reduced by a predetermined reduction value from an actual rise rate of the engine rotation speed and thereafter set the rise rate of the engine rotation speed of the internal combustion engine to the higher rise rate, in a case that the actual rise rate is increased beyond the higher rise rate by elapse of a predetermined time after the completion of the start-up control.

2. The vehicle control apparatus as set forth in claim 1, in which the rise rate setting unit being operative to repeatedly reduce the actual rise rate by the reduction value to obtain a set value of the rise rate of the engine rotation speed of the internal combustion engine, thereby converging the set value of the rise rate of the engine rotation speed of the internal combustion engine to the higher rise rate, in a case that the actual rise rate of the engine rotation speed is increased beyond the higher rise rate by elapse of a convergence time, which is shorter than the predetermined time, after elapse of a predetermined time after the completion of the start-up control.

3. The vehicle control apparatus as set forth in claim 1, which further comprises a rise rate detection unit that detects the actual rise rate of the engine rotational speed in accordance with the rotation of the output shaft of the internal combustion engine, in which the rise rate setting unit is operative to set as a new rise rate of the engine rotational speed a value reduced by the reduction value from the previously detected actual rise rate of the engine rotational speed, when setting the rise rate of the engine rotation speed.

4. The vehicle control apparatus as set forth in claim 1, in which the rise rate setting unit uses an accelerator opening degree as the acceleration request.

5. The vehicle control apparatus as set forth in claims 4, in which the rise rate setting unit is operative to set the rise rate of the engine rotational speed at a level high as the accelerator opening degree is high.

* * * * *